May 21, 1935.  S. W. KRYSZEWSKI ET AL  2,002,065
COOLING TOWER
Filed May 20, 1931   5 Sheets-Sheet 5
Fig. 8.
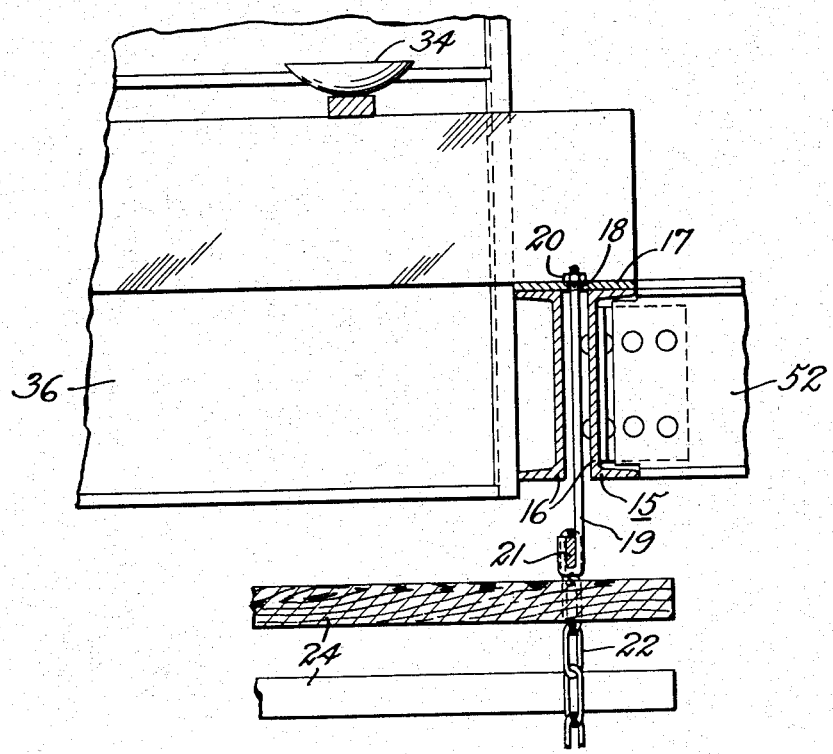
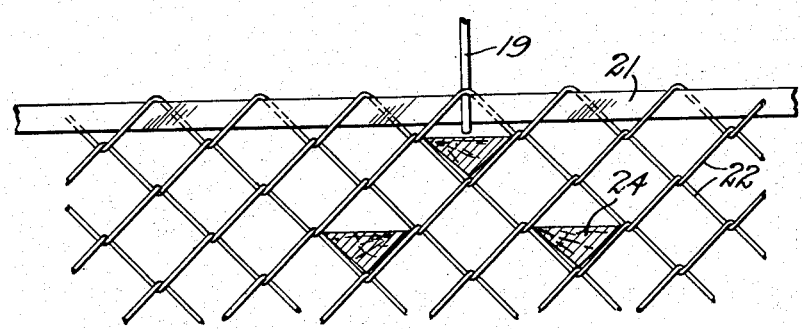
Fig. 9.

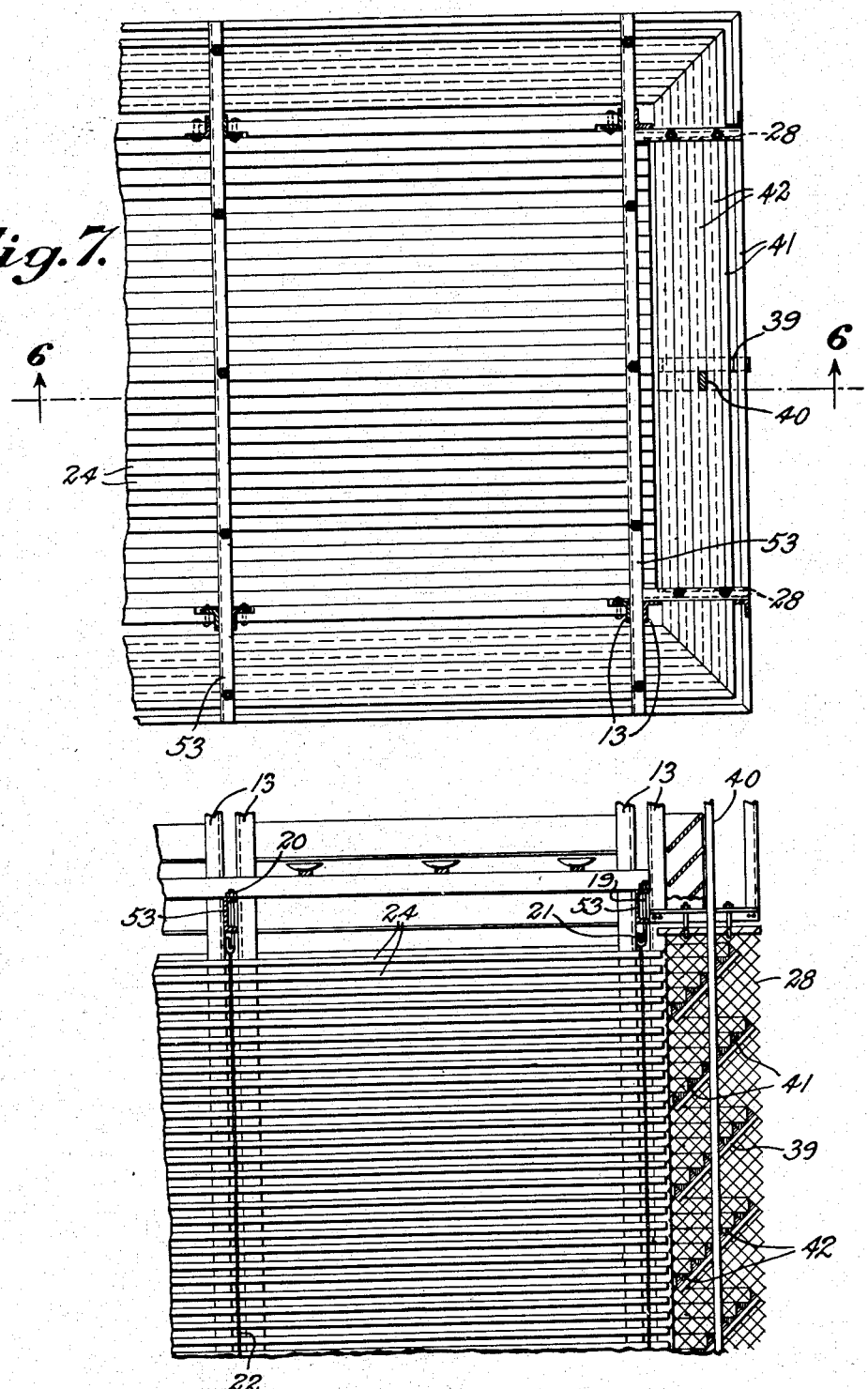

Patented May 21, 1935

2,002,065

UNITED STATES PATENT OFFICE 2,002,065

COOLING TOWER

Stanley Walter Kryszewski, Carteret, and Ernest Linwood Cahoon, Westfield, N. J., assignors to Foster Wheeler Corporation, New York, N. Y., a corporation of New York Application May 20, 1931, Serial No. 538,746

19 Claims. (Cl. 261—109)

This invention relates to cooling towers and particularly to cooling towers of the atmospheric type. Cooling towers are used to cool water which has been previously utilized for cooling some heat giving element, such as, by way of example, a steam condenser, a refrigerant condenser, an oil cooler or an internal combustion engine. The water cooled in the cooling tower may then be used over again to remove further heat from the heat giving element.

In cooling towers of the atmospheric type, water is introduced at the top of the tower and distributed over a number of horizontal members known as splash pieces. The water cascades downwardly through the tower over the splash pieces while atmospheric air circulates in contact with the water. Louver boards at the sides of the tower prevent the splashing and blowing of water out of the tower. A small percentage of the water is evaporated and this evaporation removes heat from the remaining water, thus cooling it. A slight amount of cooling may be obtained due to the temperature difference of the air and the water supplied to the top of the tower.

Natural winds and breezes are relied upon to cause circulation of air through the tower. It is therefore necessary that the air be allowed to pass through the tower with as little obstruction as is possible. One of the objects of this invention is to provide an atmospheric tower which furnishes less obstruction to the passage therethrough of air than has been the case with previously known towers. Another object of the invention is to provide towers both of the atmospheric and enclosed type which are cheap and easy to assemble. Both of these objects are obtained by the use of sheets or pieces of woven wire mesh arranged vertically for supporting the splash pieces or the louver boards or both.

Further objects and advantages will be apparent from the following description considered in connection with the accompanying drawings which form a part of this specification and on which:

Fig. 6 is a cross-sectional view of another modification and is taken on the line 6—6 of Fig. 7;

Fig. 7 is a top view of the tower shown in Fig. 6;

Fig. 8 is an enlarged view, partially in cross-section, of details of construction used in the towers shown in the previous figures; and Fig. 9 is an enlarged view of further details of construction.

Figure 1:
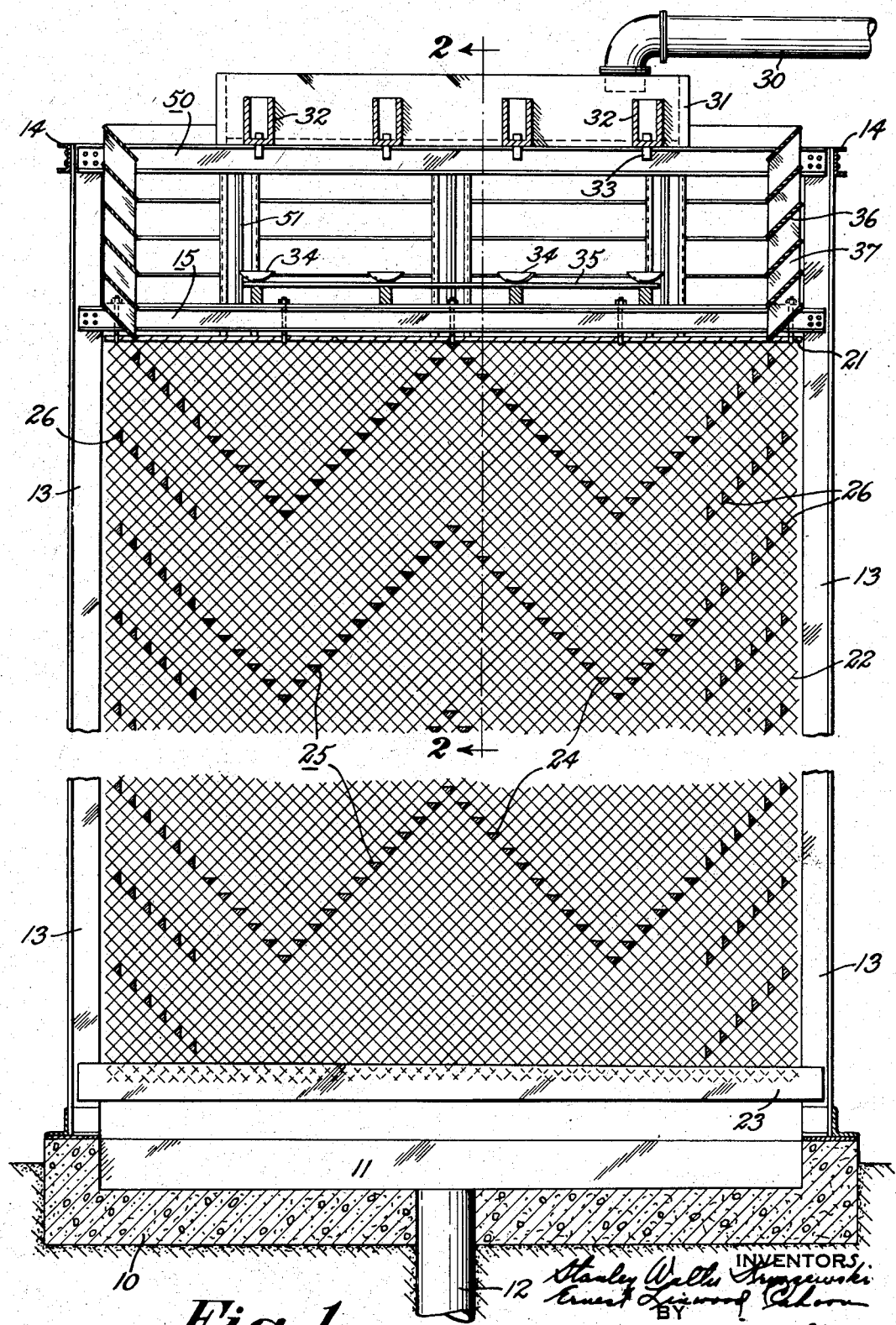
Fig. 1 is a cross-sectional view of a cooling tower embodying the invention and is taken on the line 1—1 of Fig. 3.
Figure 2:
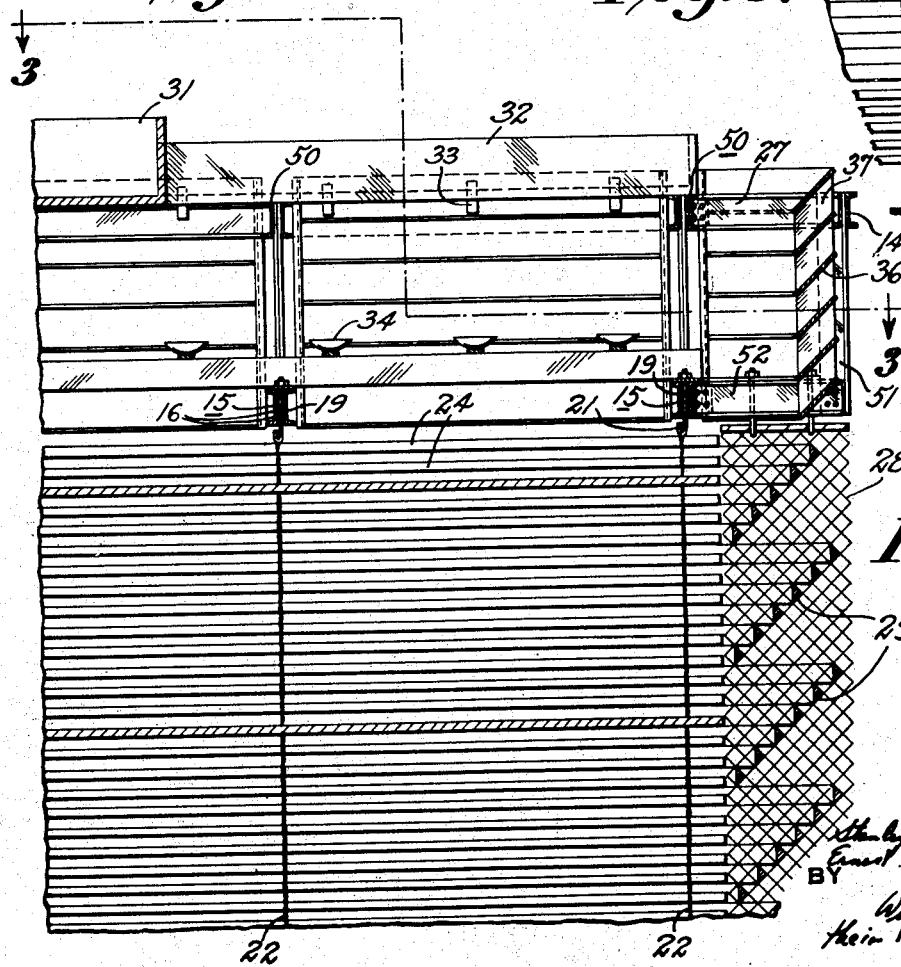
Fig. 2 is a side cross-sectional view of a portion of the tower shown in Fig. 1 and taken on the line 2—2 of Fig. 1.
Figure 3:
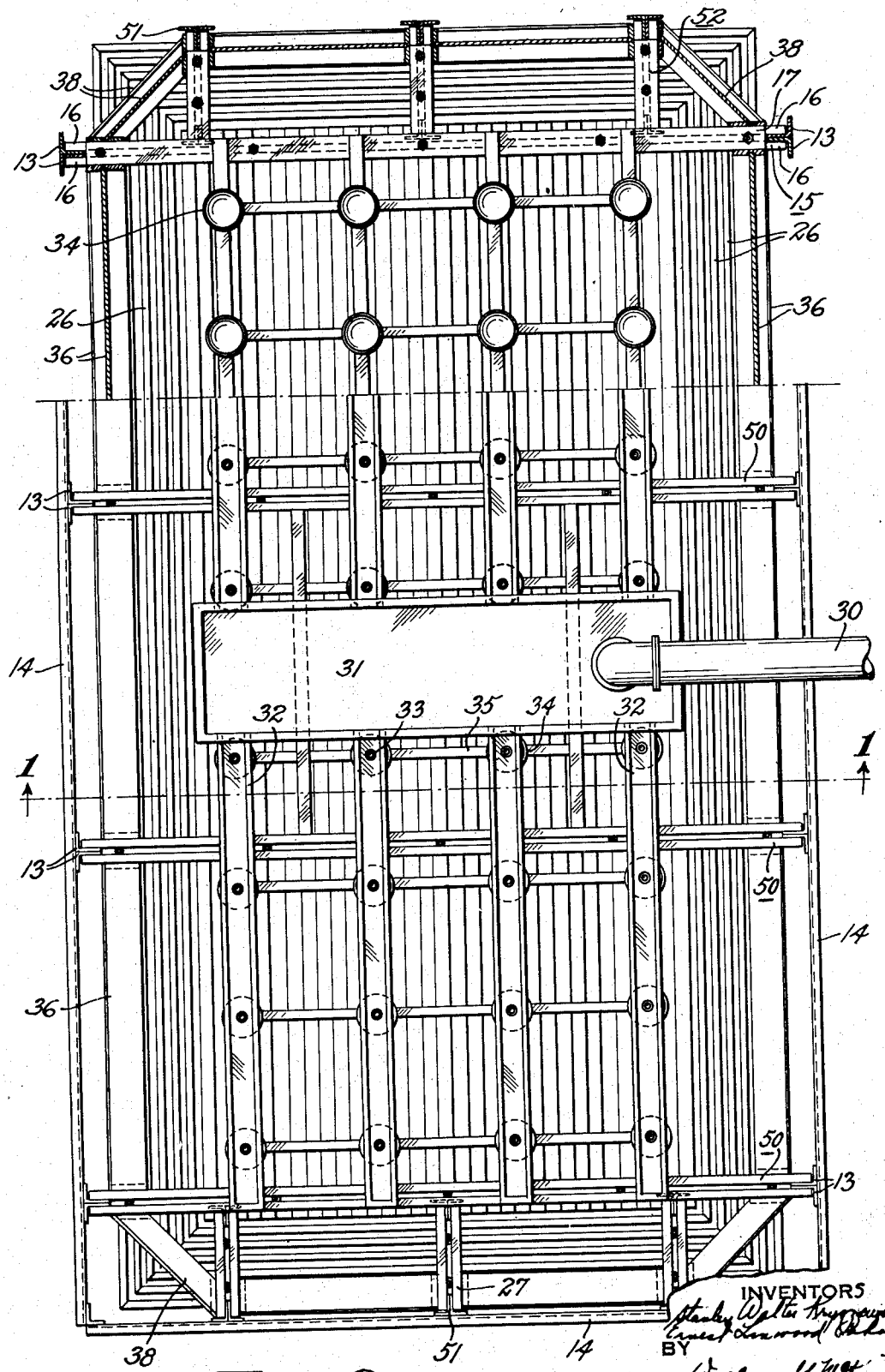
Fig. 3 is a view, partially in cross-section, taken on the line 3—3 of Fig. 2.

Referring more particularly to Figs. 1, 2 and 3, reference character 10 designates a foundation preferably constructed of concrete. Foundation 10 forms a sump 11 for receiving water which has passed through the tower. A conduit 12 conducts water from sump 11.

Secured to or resting on foundation 10 are a number of upright members 13, each comprising a pair of steel angles. Members 13 and other members constituting the frame work of the tower are shown as being made of structural steel but it is to be understood that I may employ other materials, such as wood. The upper ends of members 13 are joined together by horizontally extending steel members 14 which extend around the four sides of the tower. In the tower shown there are provided four vertical members 13 on each side of the tower, one adjacent to each end of the tower and two intermediate thereof. Corresponding members 13 on opposite sides of the tower are joined together near their upper ends by horizontal members 50 which are secured on either side of the angles comprising the upright members. Extending between vertical members 13 some distance below horizontal members 50 are similar horizontal members 15. As is shown particularly in Fig. 8, members 15 comprise a pair of flanged steel beams 16 placed with their backs toward each other and spaced apart by the flanges of members 13. A plate 17 (see Fig. 8) rests on each of the members 15 and spans the space between beams 16 and is provided with a series of holes 18. Rods 19 extend through holes 18 and are provided at their upper ends with nuts 20 which bear upon plates 17 and support the rods. The lower ends of rods 19 are hook-shaped and engage horizontal members or bars 21. Members 50 are similar to members 15, except that the plates 17 are omitted.

Sheets of woven wire mesh 22 having substantially square openings therethrough are secured to bars 21 in any desired manner and preferably by having the bars 21 extend through the upper rows of openings in the mesh sheets, as is shown particularly in Fig. 9. The mesh members 22 are of such vertical extent that they extend from bars 21 to the lower part of the tower where their lower edges are secured in any suitable manner to horizontal members 23 in order to maintain the mesh sheets in stable position. The horizontal extent of each mesh sheet 22 is such that it reaches from one side of the tower to the other. Each sheet of woven wire mesh 22 comprises a unitary screen which is capable of being supported wholly along its upper edge. Obviously, one transverse mesh member 22 may be made up of two or more vertically extending strips or sections.

As clearly shown in Fig. 9, the wire mesh is arranged diagonally. That is, the wire pieces adjacent the openings run at an angle to the horizontal. In the embodiment shown, the wire mesh is woven to form diagonal wires at 45° to the horizontal and 90° to each other and with the individual wires being held or joined together at points at which they intersect. The wire mesh consists of a plurality of horizontal zig-zag bent wires, each, except the uppermost, being hung from the next upper wire and the uppermost being, so to speak, wound around and supported by bar 21.

In the form of tower shown in Figs. 1 through 3 there are provided four such sheets or members of wire mesh extending from one side of the tower to the other. The wire mesh members serve to support horizontal splash pieces 24. Splash pieces 24 preferably have a triangular cross-section of a size approximately one-half the size of the openings in the wire mesh. Each splash piece is passed through corresponding openings in the wire mesh members in which it fits snugly and is thereby supported by the wire mesh members. The splash pieces may be arranged in rows or decks, designated by reference character 25, so as to form substantially unobstructed passageways therebetween for the passage of air through the tower.

Near each side of the tower there is provided a number of groups of horizontal members 26 forming louver boards. These louver boards are preferably made of the same pieces as splash pieces 24 but are placed with their largest face in a vertical position in order to present this face to water which has a tendency to splash or be blown out of the tower. There are preferably provided at least twice as many louver boards as there are decks 25. As shown, there is one louver board forming a continuation of each deck and one row between each deck. The members 26 forming the louver boards are supported by the wire mesh members 22 in the same manner as described in connection with splash pieces 24.

It is also highly desirable to provide louver boards at the ends of the tower as well as at the sides. As is shown in Figs. 1 through 3, horizontal members 27 extend from members 50 at the ends of the tower to members 14. Members 27 are made up of two beams in the same manner as are members 50. Depending from members 14 adjacent to the points of attachment of members 27 are short vertical members 51 made up of pairs of angles. Members 51 support the outer ends of horizontal members 52, the inner ends of which are secured to members 15. Members 52 support comparatively narrow strips of wire mesh 28. It will thus be seen that wire mesh members 28 are at right angles to wire mesh members 22. Louver pieces 29 which are similar to louver pieces 26 are supported by the wire mesh strips 27 at either end of the tower.

At the top of the tower above the uppermost deck 25 there is provided means for distributing the water to be cooled. This water is supplied through a conduit 30 to a main trough 31. Communicating with trough 31 is a number of distributing troughs 32. Each distributing trough 32 is provided with a series of pipe nipples 33 extending through the bottoms thereof. Situated directly beneath each pipe nipple is a splash plate 34 supported on horizontal members 35. Splash plates 34 have a spherical shape and serve to break up the streams of water impinging thereon from pipe nipples 33.

Additional louver boards 36 are preferably provided between the uppermost deck 25 and the top of the tower. Louver boards 36 comprise wooden boards placed in an inclined position, as is shown in Fig. 1, and supported at their ends by means of vertical members 37. Louver boards 36 are provided around the four sides of the tower while at the corners short louver boards 38 may extend in a diagonal direction connecting the louver boards at the sides and the ends of the tower.

In operation, warm water is supplied to main trough 31 through conduit 30. From trough 31 the water passes to distributing troughs 32 and through pipe nipples 33 to splash pieces 34. Upon striking splash pieces 34 the water is broken up into drops which descend and strike the uppermost splash pieces 24. The water drops from the splash pieces in the upper part of the tower to the splash pieces next below and so on downwardly through the tower. Atmospheric air circulates in a generally horizontal direction through the tower and comes in intimate contact with the drops of water descending from one deck of splash pieces to the next below. A small amount of water is thereby evaporated and thus causes cooling of the remaining water. This remaining water is collected in sump 11 and conducted therefrom through conduit 12 to be used over again for cooling purposes.

Figure 4:
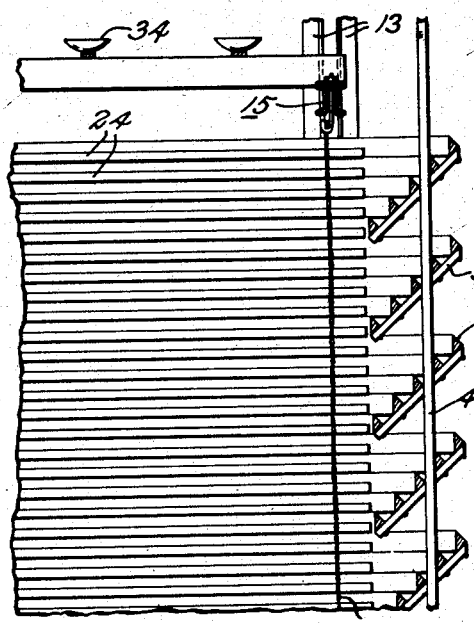
Fig. 4 is a cross-sectional view of a portion of a somewhat modified form of cooling tower and is taken on the line 4—4 of Fig. 5.
Figure 5:
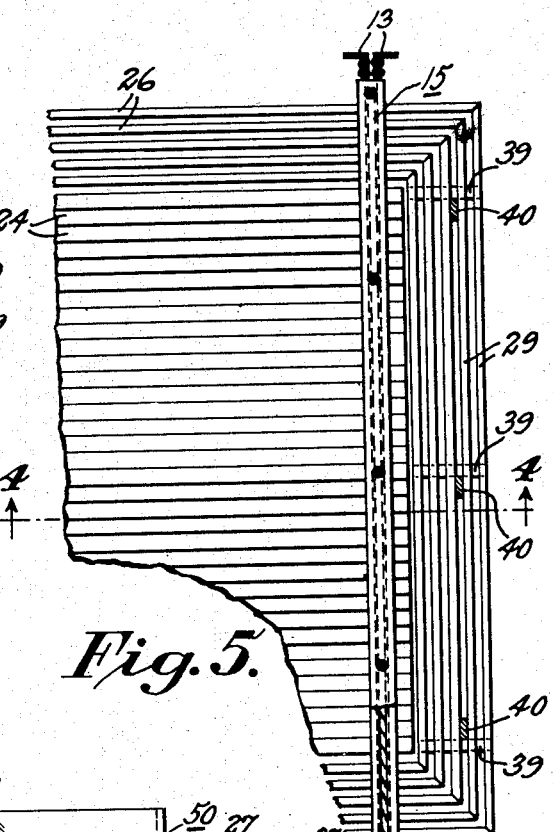
Fig. 5 is a top view of the tower shown in Fig. 4.

The tower shown in Fig. 4 is similar to the tower just described with the exception that instead of providing additional wire mesh members 28 for supporting louver boards at the ends of the tower, these louver boards are supported by inclined members 39. Members 39 are secured to vertical members 40 which extend upwardly from the foundation of the tower. As is shown in Fig. 5 there are provided three upright members 40 each supporting a series of inclined members 39.

As is shown in Figs. 6 and 7, the louver pieces may be so arranged as to form substantially continuous louver boards. To accomplish this a number of louver pieces 41 are placed with their largest face in a vertical position while additional louver pieces 42 are placed between them with their largest face in a horizontal position. Both louver pieces 41 and 42 are supported in the openings formed in wire mesh 28. This arrangement of louver boards is somewhat more efficient in preventing the escape of water from the sides and ends of the tower than either of the arrangements shown in Figs. 1 through 5. As appears particularly from Fig. 7, the louver boards at the ends of the tower may be supported both by wire mesh members 28 and by inclined members 39 carried by vertical members 40. In the present instance wire mesh strips 28 are provided near the ends of the louver boards while the central portions are supported by members 39. A further modification of structural detail is shown in Figs. 6 and 7 and consists in the substitution of a single horizontal beam 53 for the pairs of beams 16 comprising members 15 of the previously described modifications. Rods 19 extend through holes formed in the flanges of beams 53 and are supported by the nuts 20 resting on the top of the upper flange.

It will be understood that wire mesh may be used for supporting the splash pieces in an enclosed tower as well as an atmospheric tower.

While several embodiments of the invention have been shown and described, it is to be understood that various other structures may be used to embody the invention.

What we claim is:

1. In a cooling tower, a frame for the tower, wire mesh members supported by said frame, splash pieces and louver pieces supported by said wire mesh members, additional wire mesh members extending at right angles to said first mentioned wire mesh members and supported by the frame and louver pieces supported by said last mentioned wire mesh members.

2. In a cooling tower, a frame for the tower, wire mesh members supported by said frame, splash pieces and louver pieces extending lengthwise of said tower and supported by said wire mesh members, additional wire mesh members adjacent to the ends of said tower and extending at right angles to said first mentioned wire mesh members and supported by the frame, and louver pieces extending cross-wise of said tower and supported by said last mentioned wire mesh members.

3. In a cooling tower, a frame for the tower, wire mesh members supported by said frame, splash pieces and louver pieces extending lengthwise of said tower and supported by said wire mesh members, inclined members at the ends of said tower and louver pieces extending cross-wise of said tower and supported by said inclined members.

4. In a cooling tower, a frame for the tower including horizontal members comprising spaced beams and a plate secured to said beams and spanning the space therebetween, rods depending from the plates, additional horizontal members supported by said rods, wire mesh members supported by said additional horizontal members, and splash pieces supported by said wire mesh members.

5. In a cooling tower, a plurality of vertical members, a plurality of horizontal members supported by said vertical members, each of said horizontal members comprising spaced beams and a plate secured to said beams and spanning the space therebetween, rods depending from the plates, additional horizontal members supported by said rods and wire mesh members supported by said additional horizontal members, said additional horizontal members passing through the uppermost rows of openings in said wire mesh members.

6. In a cooling tower, a frame for the tower, wire mesh members supported by said frame, said wire mesh members comprising a plurality of spaced intersecting wires held together at their intersections and defining rectangular openings therebetween, and triangular splash pieces extending through said openings and supported by said wire mesh members, the cross-section of said splash pieces having substantially the same size and shape as one-half of one of said openings.

7. In a cooling tower, a frame for the tower, wire mesh members supported by said frame, said wire mesh members comprising a plurality of spaced intersecting wires held together at their intersections and defining square openings having inclined sides therebetween, triangular splash pieces extending through said openings, the cross-section of said triangular splash pieces having substantially the same size and shape as one-half of one of said square openings whereby one face of said splash pieces is wider than the other faces, said splash pieces being arranged with said wider face in an upper horizontal position, and louver pieces extending through openings in said wire mesh members, said louver pieces having the same cross-sectional size and shape as said splash pieces and being arranged with their wider faces in a vertical position.

8. In a cooling tower, a framework for the tower, wire mesh members, each of said wire mesh members comprising a plurality of wires joined together to form a unitary screen capable of being supported wholly along its upper edge, the screens being supported by said framework, splash pieces supported by said screens, louver pieces supported by said screens, additional wire mesh members disposed at the ends of the splash pieces and approximately parallel thereto and louver pieces supported by said additional wire mesh members.

9. In a cooling tower, a frame for the tower, wire mesh members hung from the frame, splash pieces and louver pieces supported by said wire mesh members, additional wire mesh members disposed at the ends of the splash pieces and louver pieces supported by the additional wire mesh members so as to extend across the ends of the splash pieces.

10. In a cooling tower, a frame for the tower, wire mesh members hung from the frame, said wire mesh members comprising a plurality of spaced intersecting wires held together at their intersections and defining rectangular openings therebetween, splash pieces having an approximately triangular cross-section extending through said openings and supported by said wire mesh members, and louver pieces of approximately triangular cross-section extending through said openings and supported by said wire mesh members, each of said louver pieces having a face thereof disposed in a vertical position.

11. In a cooling tower, a frame for the tower, wire mesh members hung from the frame, said wire mesh members comprising a plurality of spaced intersecting wires held together at their intersections and defining rectangular openings therebetween, splash pieces having an approximately triangular cross-section extending through said openings and supported by said wire mesh members, and louver pieces of approximately triangular cross-section extending through said openings and supported by said wire mesh members, each of said splash pieces having a face thereof disposed in an approximately upwardly directed horizontal position.

12. In a cooling tower, a frame for the tower, wire mesh members hung from the frame, said wire mesh members comprising a plurality of spaced intersecting wires held together at their intersections and defining rectangular openings therebetween, splash pieces having an approximately triangular cross-section extending through said openings and supported by said wire mesh members, and louver pieces of approximately triangular cross-section extending through said openings and supported by said wire mesh members, each of said splash pieces having a face thereof disposed in an approximately upwardly directed horizontal position and each of said louver pieces having a face thereof disposed in a vertical position.

13. In a cooling tower, a frame for the tower, wire mesh members hung from the frame, said wire mesh members comprising a plurality of spaced intersecting wires held together at their intersections and defining openings therebetween, splash pieces extending through said openings and supported by the wire mesh members and having a face disposed in an upwardly directed horizontal position and louver pieces extending through said openings and supported by the wire mesh members and having a face disposed in a substantially vertical position.

14. In a cooling tower, a frame for the tower, wire mesh members hung from the frame, said wire mesh members, comprising a plurality of spaced intersecting wires held together at their intersections and defining openings therebetween, splash pieces extending through said openings and supported by the wire mesh members, and louver pieces extending through said openings and supported by the wire mesh members and having a face disposed in a substantially vertical position.

15. In a cooling tower, a frame for the tower, wire mesh members hung from the frame, said wire mesh members, comprising a plurality of spaced intersecting wires held together at their intersections and defining openings therebetween, splash pieces extending through said openings and supported by the wire mesh members and having a face disposed in an upwardly directed horizontal position, louver pieces extending through said openings at the sides of the tower and supported by the wire mesh members and having a face disposed in a substantially vertical position and additional louver pieces extending across the ends of the said splash and louver pieces.

16. In a cooling tower, a frame for the tower, wire mesh members hung from the frame, said wire mesh members comprising a plurality of spaced intersecting wires held together at their intersections and defining openings therebetween, splash pieces extending through said openings and supported by the wire mesh members and having a face disposed in an upwardly directed horizontal position, louver pieces extending through said openings at the sides of the tower and supported by the wire mesh members and having a face disposed in a substantially vertical position, and additional louver pieces extending across the ends of the said splash and louver pieces, said additional louver pieces having a face disposed in a substantially vertical position.

17. In a cooling tower, a frame for the tower, wire mesh members hung from the frame, said wire mesh members comprising a plurality of spaced intersecting wires held together at their intersections and defining openings therebetween, splash pieces extending through said openings and supported by the wire mesh members, and louver boards supported by the wire mesh members and consisting of a plurality of louver pieces extending through said openings.

18. In a cooling tower, a frame for the tower, wire mesh members hung from the frame, said wire mesh members comprising a plurality of spaced intersecting wires held together at their intersections and defining openings therebetween, splash pieces extending through said openings and supported by the wire mesh members, and louver boards supported by the wire mesh members and consisting of a plurality of louver pieces disposed closely adjacent each other and extending through said openings.

19. In a cooling tower, a frame for the tower, wire mesh members hung from the frame, said wire mesh members comprising a plurality of spaced intersecting wires held together at their intersections and defining openings therebetween, splash pieces extending through said openings and supported by the wire mesh members, louver boards supported by the wire mesh members and consisting of a plurality of louver pieces extending through said openings, and additional louver boards consisting of a plurality of louver pieces disposed closely adjacent each other, said additional louver boards being disposed across the ends of the splash pieces.

STANLEY WALTER KRYSZEWSKI.
ERNEST LINWOOD CAHOON.